UNITED STATES PATENT OFFICE.

KRISTIAN M. CHRISTENSEN, OF OMAHA, NEBRASKA.

METHOD OF PRESERVING EGGS.

1,184,621.　　　Specification of Letters Patent.　　Patented May 23, 1916.

No Drawing.　　Application filed August 12, 1915.　Serial No. 45,220.

*To all whom it may concern:*

Be it known that I, KRISTIAN M. CHRISTENSEN, a subject of the King of Denmark, residing at Omaha, in the county of Douglas and State of Nebraska, have invented certain new and useful Improvements in Methods of Preserving Eggs, of which the following is a specification.

This invention relates to improvements in the art of preservation of food, and more particularly to the treatment of eggs for increasing the length of time an egg will remain fresh and good.

The object in view is the incasing of a shell of an egg by a coating of a preservative compound adapted to serve both for excluding air from and for direct preservation of the contents of the egg.

With this and further objects in view, as will in part hereinafter be pointed out and in part become apparent, the invention comprises certain novel steps and combinations of steps in the process of treatment of eggs, as will subsequently be rendered clear and thereafter particularly pointed out in the claims.

In the practising of the invention, an aqueous solution of magnesium chlorid ($MgCl_2 + H_2O$) is formed, and the eggs to be preserved are dipped therein and removed therefrom carefully with a view of draining excess fluid without breaking or destroying a coating formed on the shell from the solution. The egg is permitted to drain until dry and is then ready for storage or shipment.

While the full and exact chemical action is not known, it is clear at least that the interstices of the shell are interfilled with a saline deposit, and a coating of the same substance is formed over the entire shell. This deposit of magnesium chlorid is strongly deliquescent and consequently tends to maintain a salty coating of a form adapted to preserve the egg. Where free lime appears, in the absence of carbon or phosphate, an air excluding cement will result, but it is believed that the principal preserving effect is due to the presence of the magnesium chlorid as a deposit in and on the shell.

The aqueous solution of magnesium chlorid should be a saturated solution or substantially a saturated solution.

What I claim is:—

1. In the art of preserving eggs, immersing an egg in an aqueous solution of magnesium chlorid and permitting the adhering substances to dry thereon.

2. In the art of preserving eggs, coating an egg with magnesium chlorid.

3. In the art of preserving eggs, filling the interstices of the shell of an egg and coating the shell with magnesium chlorid.

4. In the art of preserving eggs, submerging an egg in an aqueous solution of magnesium chlorid, and drying the adhering substances on the egg, the solution being substantially a saturated solution and of sufficiently high percentage to occasion the formation of a coating on the egg incident to such immersion.

In testimony whereof I affix my signature.

KRISTIAN M. CHRISTENSEN.

Copies of this patent may be obtained for five cents each, by addressing the "Commissioner of Patents, Washington, D. C."